United States Patent [19]
Hagen

[11] Patent Number: 5,582,380
[45] Date of Patent: Dec. 10, 1996

[54] LOAD-ELEVATING DECK INSERT

[76] Inventor: Stephen E. Hagen, 1436 Hamilton Ave., Palo Alto, Calif. 94301

[21] Appl. No.: 559,660

[22] Filed: Nov. 20, 1995

[51] Int. Cl.$^6$ .................................................. A47B 91/00
[52] U.S. Cl. ........................ 248/346.01; 47/71; 108/90; 248/188.2
[58] Field of Search .................. 248/346.01, 688, 248/188.2, 346.02, 146, 27.8; 108/90; 47/39 P, 71

[56] References Cited

U.S. PATENT DOCUMENTS

| | | |
|---|---|---|
| 516,679 | 3/1894 | Giller . |
| 1,559,827 | 11/1925 | Wittman . |
| 1,605,901 | 11/1926 | O'Neil . |
| 2,716,532 | 8/1955 | Wysong, Jr. . |
| 4,833,823 | 5/1989 | Edwards, III . |
| 5,209,013 | 5/1993 | Sellers . |
| 5,321,909 | 6/1994 | Loran ......................................... 47/71 |

Primary Examiner—Ramon O. Ramirez
Assistant Examiner—Michael J. Turgeon
Attorney, Agent, or Firm—Kolisch, Hartwell, Dickinson, McCormack & Heuser

[57] ABSTRACT

A support device or load-bearing elevator and system including a plurality of such devices or elevators, for use in connection with a space or spaces between adjacently-mounted deck members is described. Each device or elevator may be selectively placed in a space between two adjacent deck members for supporting objects generally above the deck members. Each device includes a space-occupying portion which extends generally into the space and an elevated portion which is joined to the space-occupying portion and extends generally away therefrom. The elevated portion defines a surface upon which objects may be placed for support generally above the deck members. The system, which includes a plurality of such devices, may be utilized in connection with one or more spaces.

18 Claims, 2 Drawing Sheets

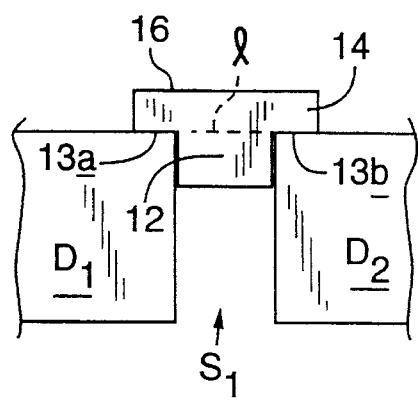
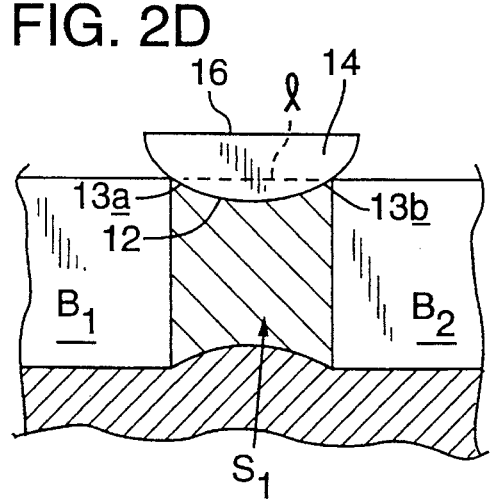
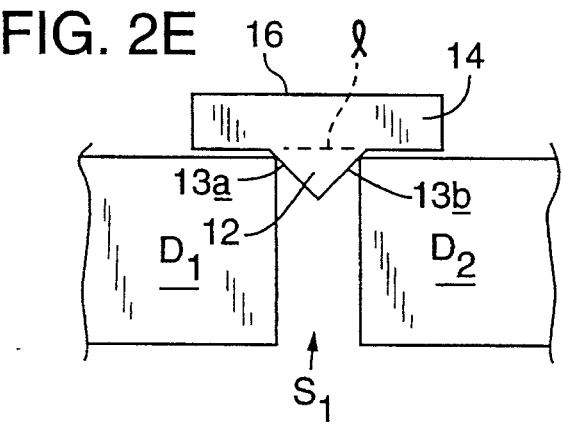
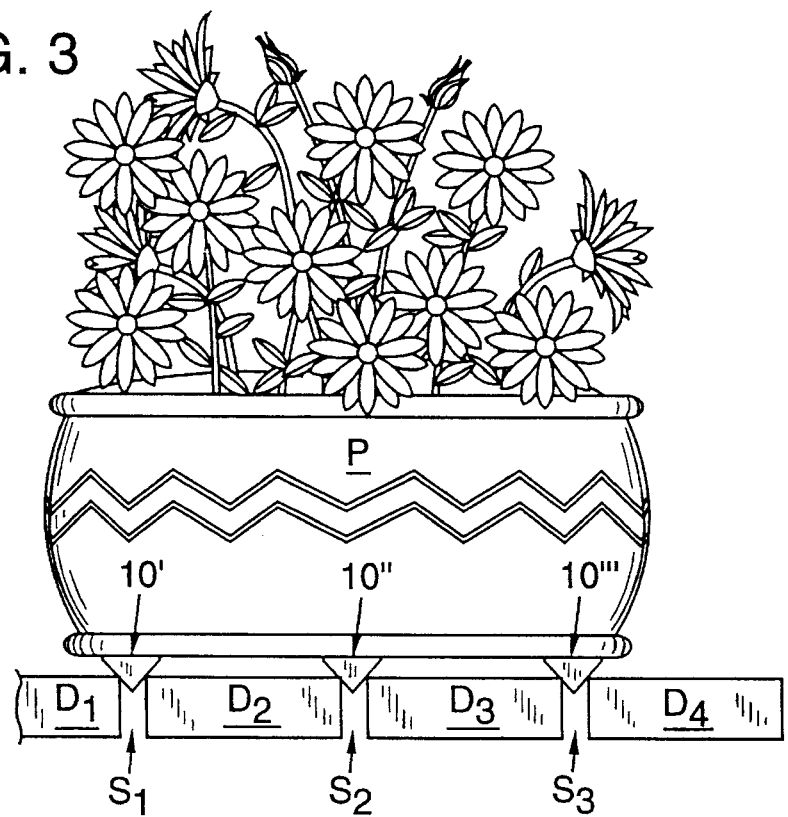

5,582,380

LOAD-ELEVATING DECK INSERT

BACKGROUND AND SUMMARY

This invention relates generally to load-supporting devices, and more particularly it concerns a load-elevating deck insert for elevating loads such as flower pots and the like, above the surface of the deck.

A significant problem with outdoor decks is that objects which are usually placed thereon leave stains or discoloration areas when, over a period of time, rain or other water, is allowed to collect around the base of such objects and is not properly removed. Although prior attempts have been made to solve this problem in the form of load-supporting devices which are placeable under such objects, such attempts have largely failed to completely address and solve this problem.

One such attempt is U.S. Pat. No. 5,321,909 to Loran which discloses a device for positioning between a plant container and a so-called substrata surface. The device includes a flat, round surface member, and a plurality of radially-disposed linear support members fixedly connected to the underside of the surface member for abutting the substrata surface and maintaining the surface member in a disposition above the substrata surface. The solution proposed by Loran is undesirable for a number of reasons. First, the surface member is of a defined size which limits the objects which may be placed thereon. Second, the linear support members each have an edge which is in contact with the so-called substrata surface or deck. This allows rain or other precipitation to collect therearound and stain the deck.

It would be advantageous to have a device for use with a deck or decking, which allows objects to be placed thereon without the risk of staining or discoloring the decking surface.

With the above problems in mind, it is a general object of the present invention to provide a load-bearing device which may be used in conjunction with a deck, so that objects may be placed thereon without the risk of water collecting around the objects' bases and staining the deck.

It is another object of the invention to provide a device which may be used in conjunction with a deck, and upon which objects may be placed, which device also allows for water which would normally collect around the bases of such objects, to drain off naturally without staining or discoloring the deck.

It is yet another object of the invention to provide a system for placing objects of various sizes and shapes on a deck, without being limited by the size and shape of the objects.

It is a further object of the invention to provide a system for placing objects of various sizes and shapes on a deck, without regard to the size and shape of the objects, and which allows water which would normally collect around the base of such objects, to drain off or evaporate naturally without staining the deck.

The invention achieves these and other objects in the form of a support device which may be selectively placed in a space between two adjacent deck members for supporting objects generally above the deck members. The device includes a space-occupying portion which extends generally into the space and an elevated portion which is joined to the space-occupying portion and extends generally away therefrom. The elevated portion defines a surface upon which objects may be placed for support generally above the deck members.

According to one feature of the invention, a load-bearing support device is provided for use in a space between two adjacently-mounted deck members. The device includes a wedge defined by two sides which are joined together at a common edge, and diverge away from one another toward respective other edges. The wedge is selectively placeable in the space between deck members so that the common edge of each side lies within the space and between adjacent deck members, and each side engages a separate deck member. A generally flat surface is joined to, and extends between the two sides and above the common edge when the wedge is placed in the space, such surface being positioned above the deck members so that objects may be placed thereon without directly contacting the deck members.

According to another feature of the invention, a system of independent, load-bearing elevators or devices are provided for use in conjunction with at least one space between adjacently-mounted deck members for supporting a load thereabove. The system includes a support surface on each elevator dimensioned for bearing a load, and at least one abutment side on each elevator joined to the support surface, being interposable, in part, in the space between the adjacently-mounted deck members for engaging at least one deck member adjacent the associated space and positioning the support surface thereabove. Each of the elevators are independently positionable on the deck members relative to one another, in the same or different spaces therebetween for accommodating objects of different sizes and shapes.

These and additional objects and advantages of the present invention will be more readily understood after a consideration of the drawings and the detailed description of the preferred and alternative embodiments.

BRIEF DESCRIPTION OF THE DRAWINGS

FIG. 2C is a view, similar to the views shown in FIGS. 2A–B, only showing an alternate embodiment of the invention.

FIG. 2D is a view, similar to the views shown in FIGS. 2A–C, only showing an alternate embodiment of the invention, and one intended for use with different deck members.

FIG. 2E is a view, similar to the views shown in FIGS. 2A–D, only showing an alternate embodiment of the invention.

FIG. 3 is an elevated front plan view showing the preferred system of the present invention.

DETAILED DESCRIPTION OF THE PREFERRED AND ALTERNATE EMBODIMENTS

Figure 1:
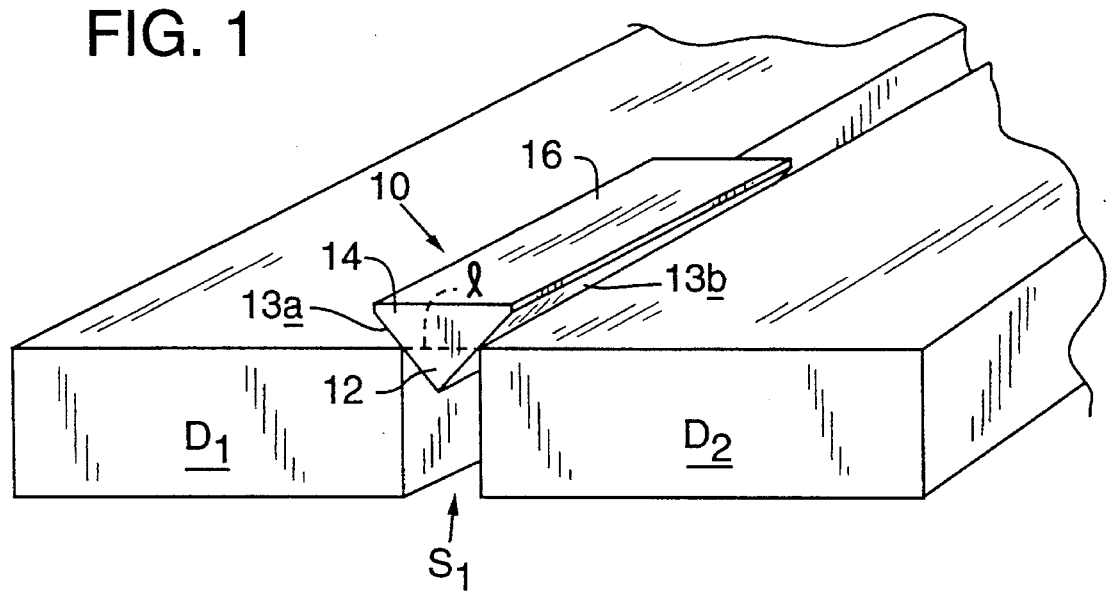
FIG. 1 is a perspective view of a support device according to the preferred embodiment of the present invention, in place between adjacent deck members.

Referring to FIG. 1, the reader will see a support device constructed according to the preferred embodiment of the present invention, generally at 10.

Support device 10 is preferably a wooden, elongate, generally wedge-shaped member which is selectively placeable in a space $S_1$ between two adjacently-mounted pieces of decking such as deck members $D_1$, $D_2$. Typically, such spaces are around ⅛- to ¼-inch in width, although the present preferred embodiment should not be limited to such dimensioned spaces. Deck members $D_1$, $D_2$ are typically wooden as well, and together with other deck members (FIG. 3), collectively define a deck which may be either an indoor or an outdoor deck. As discussed below, however, the deck members may be formed from other materials, and not necessarily just from wood. Furthermore, although the preferred embodiment of device 10 is described as being formed from wood, it will be understood that any suitable material may be used such as plastic, rubber, so-called engineered plastic, metal or the like.

Figure 2:
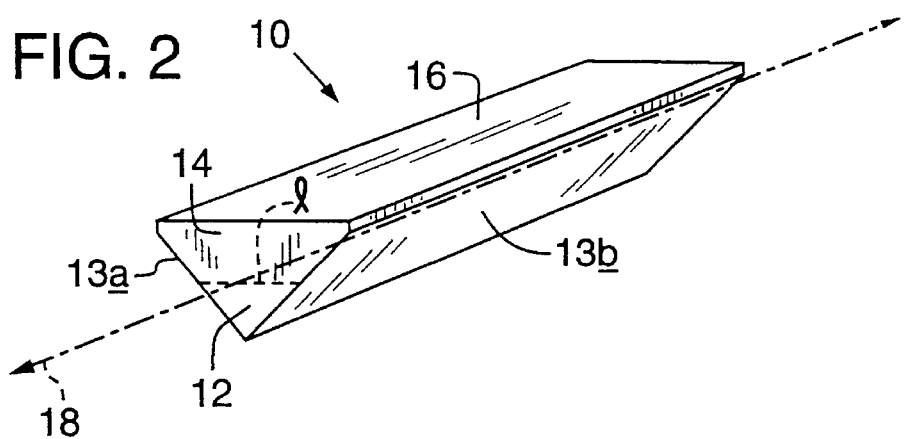
FIG. 2 is a perspective view of the support device of FIG. 1, shown apart from the adjacent deck members.
Figure 2A:
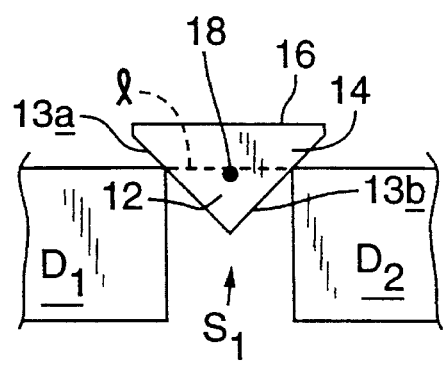
FIG. 2A is an elevated front plan view of the preferred embodiment in place between adjacent deck members.

Referring now to FIGS. 1 through 2A, the reader will see that a dashed line l divides device 10 into what may be considered a space-occupying portion 12 which extends generally into space $S_1$ between adjacent deck members $D_1$, $D_2$, and a so-called elevated portion 14 which is integrally joined to portion 12 and extends generally away therefrom and above space $S_1$ when device 10 is inserted thereinto as shown in FIGS. 1 and 2A. Elevated portion 14 includes a generally flat, planar top or support surface 16 which defines a surface upon which various objects such as flower pots, bowls, and the like may be placed for support generally above the deck members.

Preferably, as shown in FIG. 2, device 10 is elongate and extends along a generally straight central axis 18, which is also referred to herein as the long axis. Device 10 may be any suitable length, however, lengths between around 3- to 6-inches, and preferably 4-inches have been found most satisfactory. Additionally, devices ranging in height from between ¼- to 1½-inches, and preferably ½-inch have been found suitable. As perhaps best shown in FIG. 2A, where a cross-sectional view of device 10 is taken transverse the long axis 18, space-occupying portion 12, which lies below dashed line l, may be seen to be generally triangularly-shaped, and elevated portion 14, which lies above dashed line l, may be seen to be generally trapezoidal in shape. It will be appreciated, however, that elevated portion 14 includes two small edges, one each adjacent the support surface 16, and that such edges are negligible so that the elevated portion of the preferred embodiment approximates a trapezoid in transverse cross-section.

The preferred embodiment may alternatively be described as a load-bearing elevator with a support surface 16 dimensioned for bearing a load, and at least one, and preferably two, abutment sides 13a, 13b (FIG. 2) which are joined to the support surface and interposable, in part, in space $S_1$ between adjacently-mounted deck members $D_1$, $D_2$ for engaging the deck members adjacent the associated space, and positioning support surface 16 thereabove for supporting a load in an elevated position above the deck.

Another way of describing the present preferred embodiment is to recognize that device 10 is essentially a wedge defined by two sides 13a, 13b which are joined together at a common edge, i.e., the apex, which, when device 10 is in place in space $S_1$, is in an inverted orientation. From the common edge, sides 13a, 13b diverge from one another toward respective separate terminal edges which are not specifically designated. Surface 16, which is generally flat, is joined to and extends between sides 13a, 13b and above the common edge when device 10 is placed in space $S_1$. As shown in FIGS. 1 and 2A, when device 10 is placed in space $S_1$, the common edge of sides 13a, 13b lies within the space and between adjacent deck members $D_1$, $D_2$, and each of the sides engages a separate deck member.

Other embodiments of device 10 are shown in FIGS. 2B through 2E, where like elements have been similarly designated, such embodiments being characterized, as described below, by differently-shaped cross-sectional areas taken transverse the long axis.

Figure 2B:
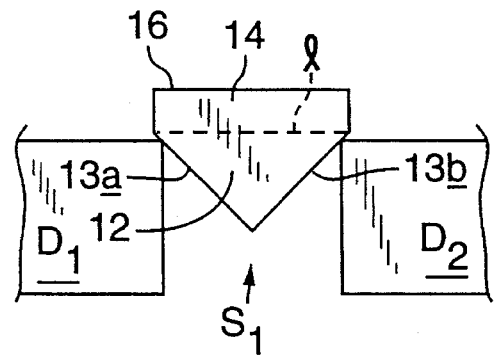
FIG. 2B is a view, similar to the view shown in FIG. 2A, only showing an alternate embodiment of the invention.

For example, FIG. 2B shows a device in which space-occupying portion 12 is generally triangularly-shaped (one side of the triangle being defined by line l), but elevated portion 14 is generally a quadrilateral (one side being defined by line l), or more specifically, a rectangle.

FIG. 2C shows a device in which space-occupying portion 12 is generally a quadrilateral (which may be either a square or rectangle depending on the dimensions of space $S_1$), and elevated portion 14 is a quadrilateral in the form of a rectangle.

FIG. 2D shows a device which may be utilized in a space $S_1$ which is slightly different from the spaces mentioned above insofar as the space in FIG. 2D is partially occupied by mortar which connects bricks $B_1$, $B_2$. Thus, it will be understood that the term "deck member" as used herein, includes bricks as well. Such bricks might be included in a deck or patio, or might form a wall upon which objects may be placed. As shown, space-occupying portion 12 includes an arcuate side and a flat side (the flat side being defined by line l).

FIG. 2E shows a device in which space-occupying portion 12 is generally triangularly-shaped, and elevated portion 14 is generally a quadrilateral, or rectangle.

The alternate embodiments include abutment sides as well, which are only briefly described. For example, FIG. 2B shows abutment sides 13a, 13b which are substantially the same as the sides in the embodiment of FIG. 2A. FIG. 2C shows abutment sides 13a, 13b which are substantially horizontal and abut the upper surface of deck members $D_1$, $D_2$. FIG. 2D shows abutment sides 13a, 13b which are generally arcuate. In fact, one may consider sides 13a, 13b in FIG. 2D as one continuous abutment side. FIG. 2E shows abutment sides 13a, 13b which are quite similar to those in FIGS. 2A and B.

FIG. 3 shows a system of load-bearing elevators which are separately designated 10', 10" and 10''', and which are positioned in respective spaces $S_1$, $S_2$, and $S_3$ (parallel to each elevator's long axis) between deck members $D_1$, $D_2$, $D_3$, and $D_4$. As shown, each of elevators 10', 10", and 10''' are independently positionable on the deck members, relative to one another, in the same or in different spaces. It so happens that FIG. 3 shows the elevators occupying different spaces; however, it will be appreciated that because loads such as flower pot P are three-dimensional and may vary in size and shape, other elevators could be, and preferably are, placed in the same space to ensure that the load is distributed evenly and that any tendency of the load to shift and become displaced is reduced, if not eliminated.

In Operation

After the above description, it should be apparent that the present preferred and alternate embodiments provide a load-bearing device which may be used in conjunction with a deck, so that objects such as flower pots, plant containers, trays and the like, may be placed thereon without the risk of water collecting around the bases of such objects and staining the deck. In this way, the deck surface may be preserved in an unstained state for a period of time which is much longer than normal.

To use the load-bearing device 10, one simply needs to identify an area on a deck or wall upon which an object, such as a flower pot or plant container will be placed, insert device 10 into a space, such as S₁ shown in FIG. 1, so that a space-occupying portion 12 extends into the space and brings abutment sides 13a, 13b into contact with adjacently-mounted deck members. When so inserted, device 10, and more particularly, abutment sides 13a, 13b enable support surface 16 to be elevated to a position above the deck so that an object may be placed thereon. A system of load-bearing devices may be employed, such as is shown in FIG. 3, when larger objects are to be placed on a deck. Then, one need only repeat the above procedure for each independently-positionable load-bearing device to apply the same to a deck.

As perhaps best shown in FIG. 1, device 10, when properly placed, allows water, which may be rain or other water, to drain off of the deck naturally, rather than collect around the bases of objects which heretofore were placed directly on the deck. To facilitate the drainage of water, each load-bearing elevator may, but need not be, provided with one or more apertures defining passageways through the device for water to pass from the deck surface to an area internally of the space therebetween. Alternatively, a series of slots may be formed in the device which are oriented generally orthogonal to long axis 18 for permitting water to drain therethrough.

It will be understood that the above-described embodiments are most useful with loads which are static, or in other words, do not move. While the devices may be used with dynamic loads, such as deck chairs which have a tendency to be moved around, the best use, or the use which is most ideal, is in conjunction with non-moving loads, for the chances of the device becoming dislodged from the space into which it has been inserted is greatly reduced.

Briefly summarizing, a support device or load-bearing elevator and system including a plurality of devices or elevators, for use in connection with a space or spaces between adjacently-mounted deck members have been described. Each device or elevator may be selectively placed in a space between two adjacent deck members for supporting objects generally above the deck members. Each device includes a space-occupying portion which extends generally into the space and an elevated portion which is joined to the space-occupying portion and extends generally away therefrom. The elevated portion defines a surface upon which objects may be placed for support generally above the deck members. The system, which includes a plurality of such devices, may be utilized in connection with one or more spaces.

While the present invention has been shown and described with reference to the foregoing preferred and alternate embodiments, it will be apparent to those skilled in the art that other changes in form and detail may be made therein without departing from the spirit and scope of the invention as defined in the appended claims.

I claim:

1. A support device for selective placement in a space between two adjacent deck members for supporting objects generally thereabove, the device comprising:

a space-occupying portion which extends generally into the space; and an elevated portion joined to the space-occupying portion extending generally away therefrom above the space, and defining a surface upon which objects may be placed for support generally above the deck members.

2. The device of claim 1, wherein the device is elongate and is placeable in a space which is generally parallel the device's long axis.

3. The device of claim 2, wherein the space-occupying portion is generally triangular in cross-sectional area taken transverse the long axis.

4. The device of claim 2, wherein the space-occupying portion defines a quadrilateral in cross-sectional area taken transverse the long axis.

5. The device of claim 4, wherein the cross-sectional area of the space-occupying portion defines a square.

6. The device of claim 4, wherein the cross-sectional area of the space-occupying portion defines a rectangle.

7. The device of claim 2, wherein the space-occupying portion has a cross-sectional area transverse the long axis which includes at least one arcuate side.

8. The device of claim 2, wherein the elevated portion is generally trapezoidal in cross-sectional area taken transverse the long axis.

9. The device of claim 2, wherein the cross-sectional area of the device taken transverse the long axis includes at least one arcuate side.

10. The device of claim 2, wherein the elevated portion defines a quadrilateral in cross-sectional area taken transverse the long axis.

11. The device of claim 2, wherein the length along the device's long axis is around between three to six inches.

12. A load-bearing support device for use in a space between two adjacently-mounted deck members comprising:

a wedge defined by two sides which are joined together at a common edge, and diverge away from one another toward respective other edges, the wedge being selectively placeable in the space so that the common edge of each side lies within the space and between adjacent deck members, and each side engages a separate deck member; and a generally flat surface joined to, and extending between the two sides and above the common edge when the wedge is placed in the space, such surface being positioned above the deck members so that objects may be placed thereon without directly contacting the deck members.

13. A system of independent, load-bearing elevators for use in conjunction with at least one space between adjacently-mounted deck members for supporting a load thereabove, the system comprising:

a support surface on each elevator dimensioned for bearing a load; and at least one abutment side on each elevator joined to the support surface, being interposable, in part, in the space between the adjacently-mounted deck members for engaging at least one deck member adjacent the associated space and positioning the support surface thereabove, wherein each of the elevators are independently positionable on the deck members relative to one another, in the same or different spaces therebetween.

14. The system of claim 13, wherein at least one of the elevators is elongate and is positionable in a space generally parallel to the elevator's long axis.

15. The system of claim 14, wherein the abutment side is parallel to the long axis.

16. The system of claim 15, wherein the abutment side is straight.

17. The system of claim 14, wherein the abutment side is arcuate relative to the long axis.

18. The system of claim 14, wherein each elevator ranges in length from between three to six inches, and wherein each support surface is generally flat.

* * * * *